Dec. 5, 1950
W. D. VAN DYKE
2,532,970
INDICATING DEVICE
Filed Dec. 8, 1947
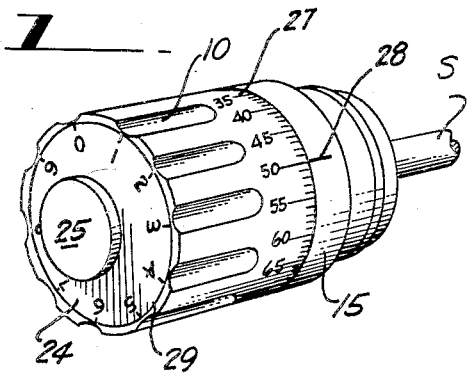
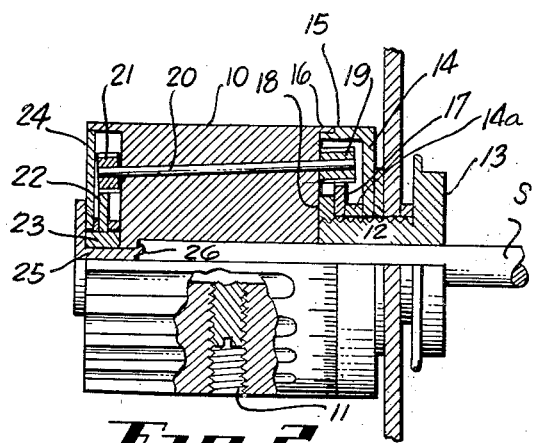 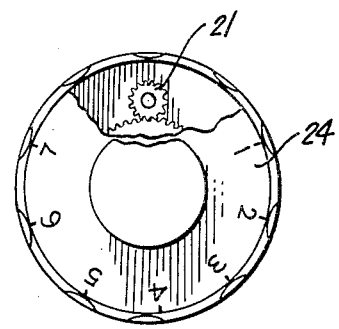
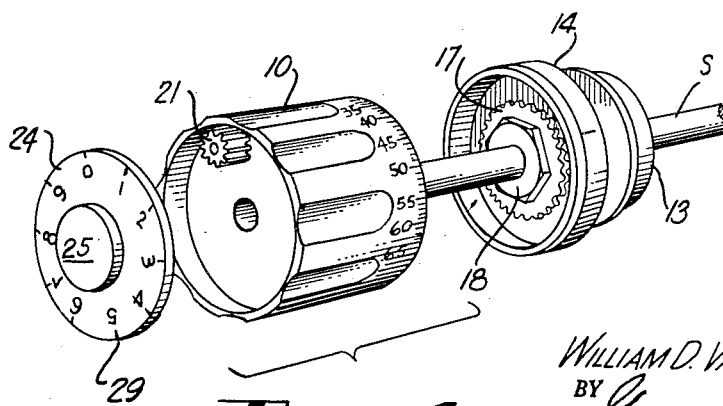
INVENTOR.
WILLIAM D. VAN DYKE
BY George T. Smyth
ATTORNEY Patented Dec. 5, 1950

2,532,970

UNITED STATES PATENT OFFICE 2,532,970

INDICATING DEVICE

William D. Van Dyke, Tarzana, Calif., assignor to Van Dyke Instruments, Inc., Tarzana, Calif.

Application December 8, 1947, Serial No. 790,402

11 Claims. (Cl. 116—133)

This invention relates to indicators, and more particularly to one cumulatively indicating a plurality of complete and fractional movements of a rotatably mounted member.

The indicator of the present invention is particularly adapted for use with various instruments or machines in which a rotor, a shaft or similar element is turned a plurality of times during the use of the same. In this use of the indicator it will indicate the number of complete revolutions of the element turned as well as the amount of partial revolutions. Furthermore, the indicia denoting the revolutions of the element may, as should be understood, be used to accurately reset the instrument. The indicator is not limited to such use, however, for it is suitable in any application where an indication of complete, as well as fractional movements of any rotatable element is desired.

The present invention, in the broadest aspects thereof, comprises an operating knob which is secured to the element to be turned, thus eliminating driving connections which in wearing introduce lost motion and ultimate inaccuracies. The indicator includes a gear to be fixedly mounted with respect to the instrument or the like with which the indicator is to be used. This gear meshes with a pinion disposed adjacent the one end of the knob and secured to an end of a small shaft rotatably carried by the operating knob. The pinion is disposed adjacent the periphery of the knob and moves about the fixed gear as a planet when the knob is turned.

The opposite end of the shaft projecting beyond the other end face of the knob carries a second pinion which meshes with and drives a sun gear fixed to a small dial rotatably carried by the operating knob. This sun gear is formed with a lesser number of teeth than the stationary gear while the pinion or planet gears are formed with an equal number of teeth.

To permit proper meshing of the pinions with their respective sun gears, the shaft driven by the one pinion is mounted within the operating knob at an angle to the axis of rotation of the knob. The planetary gear system thus effected, although inefficient, is nevertheless capable of driving the light weight dial. The load imposed by the dial is not sufficient to create wear in the system so that the dial is accurately moved throughout the service life of the indicator.

The operating knob carries a scale which cooperates with an index line, formed on a part of the indicator fixed to the instrument, machine, or the like with which the indicator is used, to indicate fractional rotation of the knob and consequently fractional rotation of the shaft or movable element of the instrument. By proper selection of the number of teeth on the sun gear carried by the dial, the dial will turn a preselected fractional revolution for each rotation of the knob.

The dial carries a scale, the divisions of which are dependent on the gear train used, which indicates in cooperation with the fiducial formed by the index line carried by the fixed part of the indicator complete revolutions of the knob. It should be seen that by varying the teeth on the gear which drives the dial a very simple means are afforded for varying the degree or amount of rotation of the dial for each rotation of the knob so that the scale of the dial may be graduated in any manner desired.

The indicator of the present invention, because of the planetary gear system used, is extremely accurate but yet compact. As the operating knob, which is directly fixed to the rotatable member, carries the scale indicating partial revolutions of the member no lost motion is introduced to create errors or inaccuracies.

Other features of the present invention will be apparent from the following description when taken in connection with the accompanying drawing in which:

Figure 1 is a perspective view of the indicator of the present invention;

Figure 2 is a side elevational view partly in section of the indicator;

Figure 3 is a front elevational view with a section of the dial broken away; and Figure 4 is an exploded view of the indicator.

The indicator of the present invention, referring now to the drawing and more particularly to Figure 2, comprises a body member 10 having a cylindrical bore coaxially extending therethrough for receiving the shaft S or the like, the revolutions of which are desired to be recorded.

Although any means desired may be used to mount the body member to the shaft or the like, it is now preferred to use a conventional "Allen" set screw threadedly mounted in a radial bore 11 intersecting the coaxially disposed bore. As will be understood, to mount the body member 10 to the shaft S it is only necessary to thread the set screw down against the shaft and clamp the same against the wall of the bore.

The body member forms the operating knob or torque applying means of the indicator and to this end is provided about its outer surface with a plurality of finger grips or large knurls as best shown in Figure 1.

A threaded bushing 12 formed with an enlarged head member 13 carries a disc-shaped member 14 having a laterally projecting annular flange 15, the outer or free edge of which is formed with an annular groove for taking a similarly shaped flange 16 of the body member or operating knob 10. It will be noted that the flanges 15 and 16 together with the operating knob 10 and the disc-shaped member 14 form a chamber for housing a reaction means having a reaction inducing periphery of a predetermined power-ratio such as a gear 17 mounted on the bushing 12 but spaced from the disc-shaped member 14 by a suitable washer 14a. The gear 17 is held against movement by a nut 18 threaded onto the bushing 12 to clamp the gear against the spacing washer 14a.

The gear 17 meshes with a pinion gear 19 fixed to one end of a shaft 20 rotatably carried by the operating knob. The opposite end of the shaft 20 carries a like pinion 21 which meshes with and drives a larger gear 22. The shaft obviously will receive the torque forces induced by movement of the pinion 19 about the periphery of the gear 17. The pinion 21 driven by the rotation of the shaft 20 in turn drives the gear 22 which has a drive-receiving periphery of a predeterminedly lower power-ratio than the reaction means or gear 17.

The end face of the knob 10 is recessed to form a cavity for receiving the gears 21 and 22. The gear 22 is fixed to and carried by a hub member 23 which also carries a flat disc-shaped dial 24 of a size sufficient to close the cavity formed in the face of the knob. The hub member 23 is rotatably mounted on a headed plug member 25 fixed to the body member forming the operating knob. The plug member may be secured to the operating knob by any means desired although in the illustrated embodiment of the invention it is secured by peening a hollow boss 26 carried by the inner face of the same over onto a shoulder formed in the bore of the operating knob 10.

The operating knob carries a scale 27 arranged about the outer peripheral surface thereof adjacent the flange 16. The scale 27 in the illustrated embodiment of the invention is divided into a hundred (100) divisions and cooperates with an index line 28 formed on the outer surface of the flange 15 of the member 14 which as explained hereinbefore is fixed relative to the shaft and the operating knob and forms, as should be understood, the index member about which rotational movement of the revolving elements of the device is compared. As the operating knob 10 is directly secured to the shaft S it will be seen that the divisions of the scale 27 will indicate in hundredths partial revolutions of the shaft. Furthermore, as the shaft is directly moved by the knob there is, it should be noted, no driving connections which in use might introduce lost motion and produce errors in the measurement of incomplete revolutions of the shaft.

In the illustrated embodiment of the invention, the dial 24 carries a scale 29 which in cooperation with the fiducial mark established by the index line 28 indicates complete revolutions of the knob and consequently the shaft S. Although by a proper selection of gears the dial 24 can be caused to rotate any degree of rotation desired for each complete revolution of the knob 10, in the embodiment of the invention illustrated, the dial rotates one-tenth ($\frac{1}{10}$) revolution for each complete revolution of the knob. To this end the scale 29 is divided into ten (10) divisions equally spaced about the periphery of the dial.

To bring about the desired rotation of the dial 24, the gear 17, although of the same pitch as gear 22, has a slightly greater diameter and is therefore formed with a larger number of teeth than the gear 22. As the pinions 19 and 21 are identical, the same must be mounted for rotation about an axis which is angularly related to the common axis of rotation of the gears 17 and 22. It will be noted that the pinion shaft 20 is mounted for rotation about an axis aslant to the axis of rotation of the gears 17 and 22.

In the embodiment of the invention herein shown, the gear 17 is provided with thirty-three (33) teeth while gear 22 is formed with only thirty (30) teeth. It will thus be seen that for each complete revolution of the knob 10, the gear 22 and consequently the dial 24 will be driven three-thirtieths ($3/30$) or one-tenth ($\frac{1}{10}$) of a revolution. As the scale 29 of the dial 24 is divided into ten (10) divisions consecutively numbered, each complete revolution of the knob 10 will move the dial one division of the scale 29 and thus indicate the number of complete revolutions of the knob.

It should now be seen that the indicator of the present invention will cumulatively indicate the number of complete revolutions of a shaft, as well as the amount in hundredths, of partial or incomplete revolutions of the same. The indicator, because of the planetary gear system used, is quite compact and thus obviates a criticism of many prior indicators of the type herein disclosed. Although the efficiency of the gear system may be low, it should be noted that the gear train drives but the small light weight dial 24 which in effect produces practically no load on the gear train. As little if any load is carried through the gearing, the same is not likely to wear in use and the readings of the dial remain accurate throughout the service life of the indicator.

Although the now preferred embodiment of the present invention is shown and described herein, it is to be understood that the present invention is not to be limited thereto but is susceptible to changes in form and detail within the scope of the appended claims.

I claim:

1. A shaft rotation counting-device, comprising: stationary gear means surrounding said shaft inwardly of the outer end thereof and having a reaction inducing periphery of a predetermined power ratio; an operating means fixedly surrounding said shaft outwardly of said gear means and peripherally graduated in fractional rotations of said shaft; a dial graduated in complete rotations of said shaft loosely supported by said operating means adjacent the outer end of said shaft; a rotatable shaft passing non-coaxially through said operating means; gear means fixed to an end of said shaft in angular and reaction revolvable engagement with said stationary gear means; gear means fixed to the other end of said shaft and driven gear means fixed to said dial and having a drive-receiving periphery of a predeterminedly lower power-ratio than that of said stationary gear means and angularly and rotatably engaging said last named gear means; whereby operation of said operating means concurrently rotates said shaft and registers rotations and fractions thereof.

2. A registering-actuator for rotary members, comprising: an operating member fixedly surrounding an end-portion of said rotary member and peripherally calibrated in fractional rotations thereof; a rotation-indicating dial rotatably mounted on the outer end of said operating member and circumferentially calibrated in complete rotations of said rotary member; gear means having a predetermined rotation-imparting power, fixedly mounted around said rotary member inwardly of said operating member; a sun gear carried by said dial of a diameter less than the diameter of said fixedly mounted gear means; a shaft extending non-coaxially longitudinally through said operating member; and identical pinion gears carried by the opposite ends of said shaft and engaged by said gear means and sun gear respectively, the pinion engaging said gear means being driven thereby as said operating member is rotated to drive the pinion engaging said sun gear thereby rotating said dial whereby actuation of said actuator quantitatively registers the rotation of said rotary member.

3. An indicator of the type described, comprising: an operating knob; means for securing said knob to a rotor or the like the revolutions of which are to be indicated; a member adapted to be fixed relative to said knob and having an index mark thereon; a scale carried by said knob and cooperative with said index mark for indicating fractional revolutions of said knob; a dial rotatably mounted to said knob; a scale carried by said dial cooperative with the fiducial established by said index mark for indicating complete revolutions of said knob; and a gear train for rotating said dial a preselected fractional amount for each complete revolution of said knob.

4. An indicator of the type described, comprising: an operating knob; means for securing said knob to a rotor or the like the revolutions of which are to be indicated; a member adapted to be fixed relative to said knob and having an index mark thereon; a scale carried by said knob and cooperative with said index mark for indicating fractional revolutions of said knob; a dial rotatably mounted to said knob; a scale carried by said dial cooperative with the fiducial established by said index member for indicating complete revolutions of said knob; a gear fixed to said index member; a gear of a different diameter fixed to said dial; a shaft extending non-coaxially longitudinally through said operating knob; a pinion fixed to each end of said shaft, one of said pinions engaging said first named gear and driven thereby as said knob is rotated, the other of said pinions engaging and driving the gear fixed to said dial upon rotation of said knob whereby said dial is driven a preselected fractional amount for each complete revolution of said knob.

5. A rotor actuating and rotation indicating device, comprising: an operating member having a central bore therethrough whereby said member may be secured to the rotor; a scale peripherally carried by said member and graduated in fractional rotations of said rotor; an index means fixed relative to said operating member; a gear fixedly carried by said index means; a shaft rotatably carried by said operating member, the axis of said shaft being oblique to the axis of the bore of said member; an identical pinion carried by each end of said shaft; one of said pinions engaging said gear and driven thereby as said member is rotated; a dial rotatably mounted to said operating member; a scale graduated in complete rotations of said rotor formed on said dial; a gear fixed to said dial and engaged and driven by the other of said pinions, said last named gear being formed with a preselected different number of teeth than the gear fixed to said index means whereby said dial is rotated a preselected fractional amount equal to a graduation of the scale carried thereby for each complete rotation of said operating member.

6. A rotor actuating and rotation indicating device, comprising: an operating member; means for securing said member to a rotor; an index means; a scale carried by said member and cooperative with said index means for indicating fractional rotations of said member; a first gear fixedly carried by said index means; a shaft carried by said member for rotation about an axis oblique to the axis of rotation of said member; an identical pinion carried by each end of said shaft; one of said pinions engaged and driven by said first gear as said member is rotated to rotate said rotor; a second gear of a different diameter than said first gear; means for mounting said second gear for rotation about an axis coincident with the axis of rotation of said member; said second gear engaged and driven by the other of said pinions, the diameter of said second gear being such relative to the diameter of said first gear that for each complete rotation of said member said second gear is rotated a preselected fractional amount; and a dial fixed to said second gear and annularly graduated into units of rotor rotation substantially equal to said preselected fractional amount of rotation of said dial.

7. A rotor actuating and rotation indicating device, comprising: an operating member having a cavity formed in each end face thereof; a sun gear disposed within each cavity, said gears being of different diameters; a planetary gear engaging each sun gear; a shaft carried by said operating member for rotation about an axis oblique to the axis of rotation of said member, said planetary gears being fixed to opposite ends of said shaft; an index means mounted adjacent the one end face of said member and closing the cavity therein; means for fixing to said index means the sun gear within the cavity closed by said index means; a scale carried by said operating member cooperative with said index means for indicating fractional rotation of said operating member; a dial closing the mouth of the other cavity of said member; means for fixing to said dial the sun gear within the cavity closed by said dial; a scale carried by said dial cooperative with said index means for indicating complete rotations of said operating member; and means for mounting said dial and the gear fixed thereto for rotation about an axis coincident with the axis of rotation of said operating member.

8. A rotor actuating and rotation indicating device, comprising: an operating member having a cavity formed in each end face thereof; means for fixing said member to a rotor; a member fixed relative to said operating member closing one of said cavities and having an index mark thereon; a scale carried by said operating member cooperative with said index mark for indicating fractional rotation of said member; a dial rotatably mounted to said operating member and closing the other of said cavities; a scale carried by said dial cooperative with said index mark for indicating complete rotations of said operating member; and gear means, including a sun and planetary gear housed within each of said cavities, for rotating said dial a preselected fractional amount for each complete rotation of said operating member.

9. A rotor actuating and rotation indicating device, comprising: a substantially cylindrical operating member; means for securing said operating member to a rotor; an index means fixedly mounted adjacent the one end face of said operating member; a scale formed about the periphery of said operating member at the end thereof adjacent to said index means and cooperative therewith for indicating fractional rotation of said operating member; a flat disc-shaped dial, means for mounting said dial adjacent the opposite end face of said operating member for rotation about an axis coincident with the axis of rotation of said operating member; a scale formed about the periphery of said dial cooperative with said index member for indicating complete rotations of said operating member; and means for rotating said dial a preselected fractional amount dependent on the graduations of the scale of said dial for each complete rotation of said operating member for cumulatively indicating a plurality of complete turns of said operating member, said means including a gear fixed to said index means and to said dial and a pinion engaging each of said gears mounted to a shaft carried by said operating member for rotation about an axis displaced from the axis of rotation of said operating member.

10. A registering actuator for a rotor of an instrument, comprising: an operating knob coaxially fixed to said rotor; a disk-like member coaxially mounted relative to said knob adjacent one end thereof; means for fixing said member to said instrument; a dial coaxially mounted to the opposite end of said knob for rotation relative thereto; a shaft carried by said knob for rotation about an axis displaced from and angularly extending relative to the axis of rotation of said knob; the opposite ends of said shaft projecting beyond the opposite end faces of said knob; a pinion fixed to each projecting end of said shaft; a gear coaxially mounted to the inner face of said fixed disk-like member and engaged with the pinion carried by the end of the shaft contiguous to said member; a gear engaged by the other of said pinions; means for coaxially mounting said last named gear to the inner face of said dial for rotating said dial as said gear is rotated; a scale graduated in increments of rotation of the rotor formed about said knob; index means formed on said fixed disk-like member and cooperative with said scale to indicate fractional rotation of said rotor; the diametral pitch of the fixed gear and that of the pinion engaged thereby being such relative to the diametral pitch of the other pinion and the gear driven thereby that for each complete rotation of said knob the pinion driving the gear fixed to said dial rotates the same a preselected fractional portion of a complete revolution; and a scale carried by said dial and graduated into units of rotor rotation, the graduations of said last named scale being arcuately spaced about said dial a distance substantially equal to said preselected fractional portion of rotation of said dial for each complete rotation of said knob and adapted to indicate complete rotations of said rotor.

11. A registering device for a rotor, comprising: a body member coaxially fixed to said rotor; a disk-like member coaxially mounted relative to said body member adjacent one end thereof and fixed relative to said rotor; a dial coaxially mounted to the opposite end of said operating member for rotation relative thereto; the opposite end portions of said body member cooperating with said disk-like member and dial, respectively, to form a chamber at each end of said body member; a shaft carried by said body member for rotation about an axis displaced from the axis of rotation of said body member; the opposite ends of said shaft projecting into said chambers; a pinion fixed to each projecting end of said shaft and movable, upon rotation of said body member, in an annular path through the chamber in which it is disposed; a gear fixed coaxially to the inner face of said disk-like member and disposed within the chamber partially formed by said disk-like member for engagement with the pinion movable around said chamber; a gear disposed within the other of said chambers and engaged by the pinion movable there around; means for coaxially mounting said last-named gear to the inner face of said dial; a scale graduated in increments of rotation of the rotor formed about said body member; an index formed on said disk-like member and cooperative with said scale to indicate fractional rotation of said rotor; the speed ratio of the fixed gear and its pinion being such relative to the speed ratio of the other pinion and the gear driven thereby that for each complete rotation of said rotor the gear fixed to said dial is driven a preselected fractional portion of a complete revolution; and a scale carried by said dial and graduated into units of rotor rotation, the graduation of said scale being arcuately spaced about the dial a distance substantially equal to said preselected fractional portion of a complete revolution of said dial for indicating complete revolutions of said rotor.

WILLIAM D. VAN DYKE.

REFERENCES CITED

The following references are of record in the file of this patent:

UNITED STATES PATENTS

| Number | Name | Date |
|---|---|---|
| 1,760,938 | Edgar | July 11, 1929 |